UNITED STATES PATENT OFFICE.

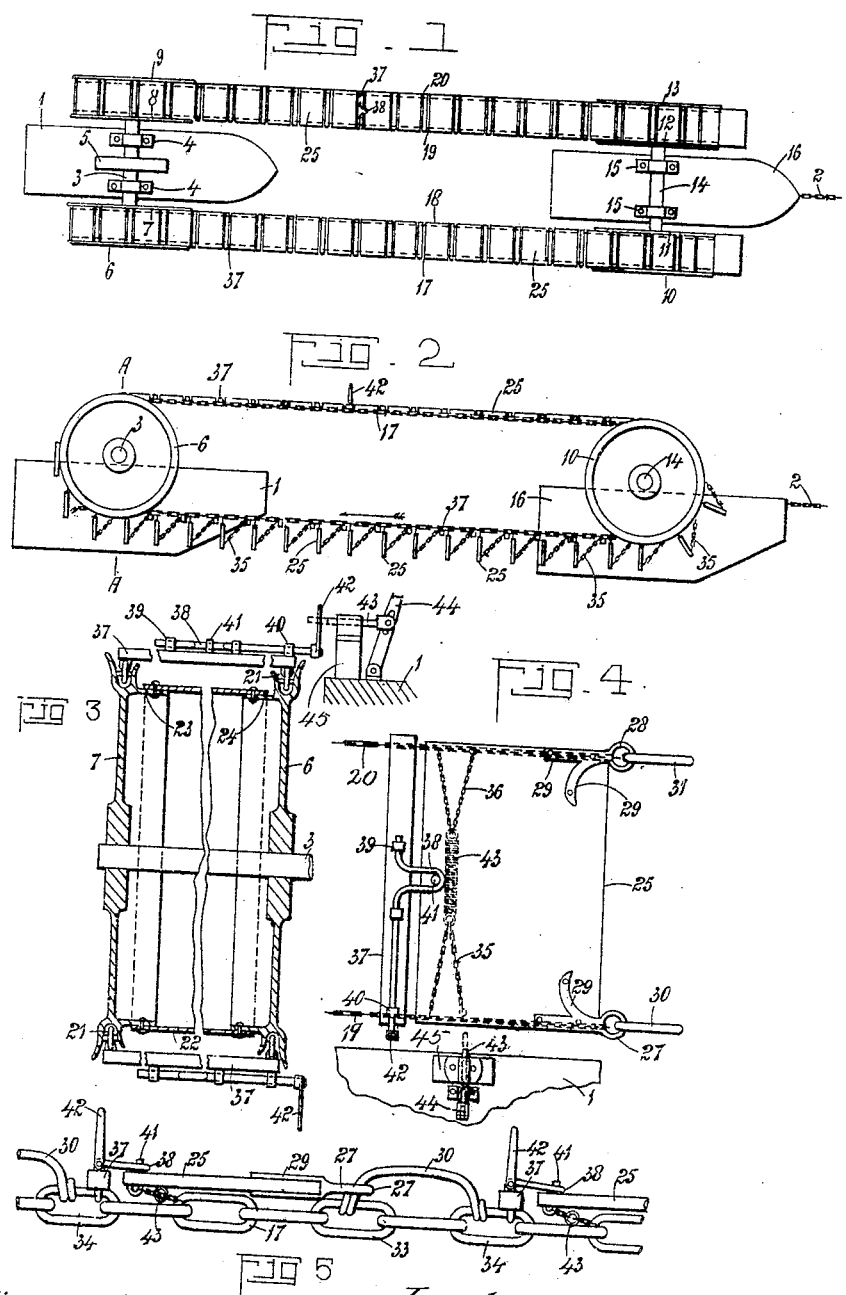

RICHARD KNOWLES PARKERSON, OF EALING, NEW ZEALAND.

WATER-MOTOR.

No. 810,507.  Specification of Letters Patent.  Patented Jan. 23, 1906.

Application filed September 3, 1904. Serial No. 223,288.

*To all whom it may concern:*

Be it known that I, RICHARD KNOWLES PARKERSON, a subject of His Majesty the King of Great Britain and Ireland, residing at Ealing, in the Provincial District of Canterbury, in the Colony of New Zealand, have invented certain new and useful Improvements in Water-Motors, of which the following is a specification.

This invention provides an improved water-motor for employment more particularly in rivers and water-courses having a rapid current.

The motor comprises a series of vanes or floats carried upon endless chains working over sprocket wheels or drums: Two of the drums are fixed upon each of two horizontal shafts arranged at a convenient distance apart, and the chains connect the opposing sprockets upon the respective shafts. The vanes are connected to the chains in such manner that they lie approximately horizontal when out of the water and upon entering the water turn over with their faces in a plane at right angles to the current. The shafts are journaled in bearings carried upon pontoons floating upon the water or upon piers of masonry or the like.

There may be a plurality of sets of apparatus as above outlined arranged side by side and connected to form one motor.

I will now particularly describe my invention by the aid of the accompanying drawings, wherein—

Figure 1 is a plan showing two sets of apparatus coupled to form one motor; Fig. 2, a corresponding side elevation. Fig. 3 is an enlarged sectional elevation on A A, Fig. 2; Fig. 4, an enlarged plan of part of the apparatus, and Fig. 5 an enlarged view of part of an endless chain fitted with floats and gear.

The pontoon 1 floats upon the water and is securely moored by the head-line 2. The shaft 3 is carried in bearings 4, fixed upon the pontoon, and has a pulley 5, from which motion may be conveyed to a dynamo or other machine carried upon the pontoon or upon shore. The sprocket-wheels 6, 7, 8, and 9 are fixed upon the shaft 3, and the sprocket-wheels 10, 11, 12, and 13 are fixed upon a shaft 14, revolubly mounted in bearings 15, carried upon a pontoon 16. Endless chains 17, 18, 19, and 20 connect the sprocket-wheels 6 and 10, 7 and 11, 8 and 12, and 9 and 13, respectively.

As one set of the apparatus is similar to the other, I will for convenience describe only one set.

As shown in Fig. 3, the sprocket-wheels have grooves 21 in their circumferential peripheries, and recesses are formed in the grooves to receive the links of the chain. A metal plate 22, bent into cylindrical form, is riveted to circular flanges 23 24, projecting inwardly from the respective sprocket-wheels.

The vanes 25, which may be of metal or wood, are in length equal to the distance between the chains 17 and 18, and each vane has two loops 27 and 28, arranged upon the bottom of the vane at opposite corners thereof, having integrally-formed brackets 29, by which they are secured in position. The loop 27 is threaded upon the metal slide-bracket 30, fixed upon the chain 17, and the loop 28 is threaded upon a corresponding bracket 31, fixed opposite to the loop 28 upon the chain 18. The brackets 30 and 31 are connected to the chains, as clearly shown in Fig. 5, the forward end of the bracket being passed through, bent around, and clamped upon the link 33, and the rear end of the bracket being secured to the link 34 in a similar manner. By this arrangement the vane assumes a horizontal position when passing out of the water and is carried forward in the same position until it reaches the forward end of the motor, when in passing over the sprocket-wheels it falls over by the action of gravity until it is at right angles to the current, when it is retained by the chains 35 and 36, each of which has one end secured to the vane and its other end secured to one of the chains 19 or 20. The chains 35 and 36 are attached to the corners of the vanes immediately opposite the loops 27 and 28. When the vanes are not in use and lying horizontally upon the chains 19 and 20, the chains 35 and 36 are slack and would be liable to be caught when passing the drums or other parts of the apparatus. To prevent such an accident, a spring 43 is introduced between the two chains 35 and 36, to the center parts of which the ends of the spring are attached. When the vanes are in use, the chains 35 and 36 are drawn taut and the spring 43 extended, and when the chains 35 and 36 are relieved of strain the spring takes up the slack.

When it is desired to stop the motor, the floats are secured when in their horizontal position, and this is effected by hand by the apparatus clearly shown in Figs. 3, 4, and 5. One set of the apparatus is used for each float, but, to simplify the drawings, in Figs. 1 and 2 is shown upon one float only. A batten 37 is secured at its ends to the chains 17 18, respectively, and has the loop 38 pivoted upon it in bearings 39 40. The loop can be caused by hand to pass over a pin 41, projecting from the vane, and thus hold the vane in horizontal position. The loop is operated by a lever 42, fixed upon it, and a bolt 43, sliding in bearings 45, fixed upon the pontoon 1, may be projected, when desired, by means of a lever 44, into the path of the lever 42, whereby the loop is operated and the vane released. By this means the vanes may be released one after the other as they pass the position where the bolt is placed. It is necessary, however, in the first place to release by hand a number of vanes sufficient to start the motor.

The recesses in the sprocket-wheels are well-known devices for engaging sprocket-chains.

Having now particularly described and ascertained the nature of my said invention and in what manner the same is to be performed, I declare that what I claim is—

1. For the purpose indicated, horizontal shafts sprocket-wheels fixed upon the ends of the said shafts, pontoons upon which the said shafts are revolubly mounted, the sprocket-wheels on the shafts being in correspondence with each other, two pairs of parallel endless chains taking into grooves of the sprocket-wheels, slide-brackets fixed upon the chains, vanes extending across each pair of chains, loops upon the vanes threaded upon the slide-brackets, check-chains connecting the vanes to the sprocket-chains, battens extending across each pair of chains and secured thereto, a loop pivoted upon each batten, a pin upon each vane to engage the said loop, and a lever for operating each loop, substantially as set forth and illustrated.

2. In apparatus for the purpose indicated, sprocket-wheels revolubly mounted in bearings and having grooves around their circumferential peripheries, a pair of endless chains taking into the said grooves, slide-brackets having one end fixed to one link of a chain and the other end fixed to another link, vanes extending across the chains, loops secured to the vanes threaded upon the said slide-brackets, check-chains connecting the vanes to the sprocket-chains, and a spring attached at each end to the check-chains for the purpose of drawing the chains together when the vanes are not in operative position, substantially as set forth.

3. In apparatus for the purpose indicated, a pair of parallel endless chains, battens disposed transversely, and secured at each end to the chains, a loop pivoted in bearings upon the battens, vanes pivoted to the chains, and a pin upon each of the vanes, levers for operating the loops, a pontoon a bearing upon the pontoon, a bolt sliding in the bearing, and a lever for projecting the bolt substantially as set forth.

In witness whereof I have hereunto set my hand in presence of two witnesses.

RICHARD KNOWLES PARKERSON.

Witnesses:
HENRIE H. RAYWARD,
A. H. HART.